Feb. 13, 1934.   R. B. FAGEOL   1,947,337
MOTOR VEHICLE
Original Filed Feb. 11, 1925   3 Sheets-Sheet 1
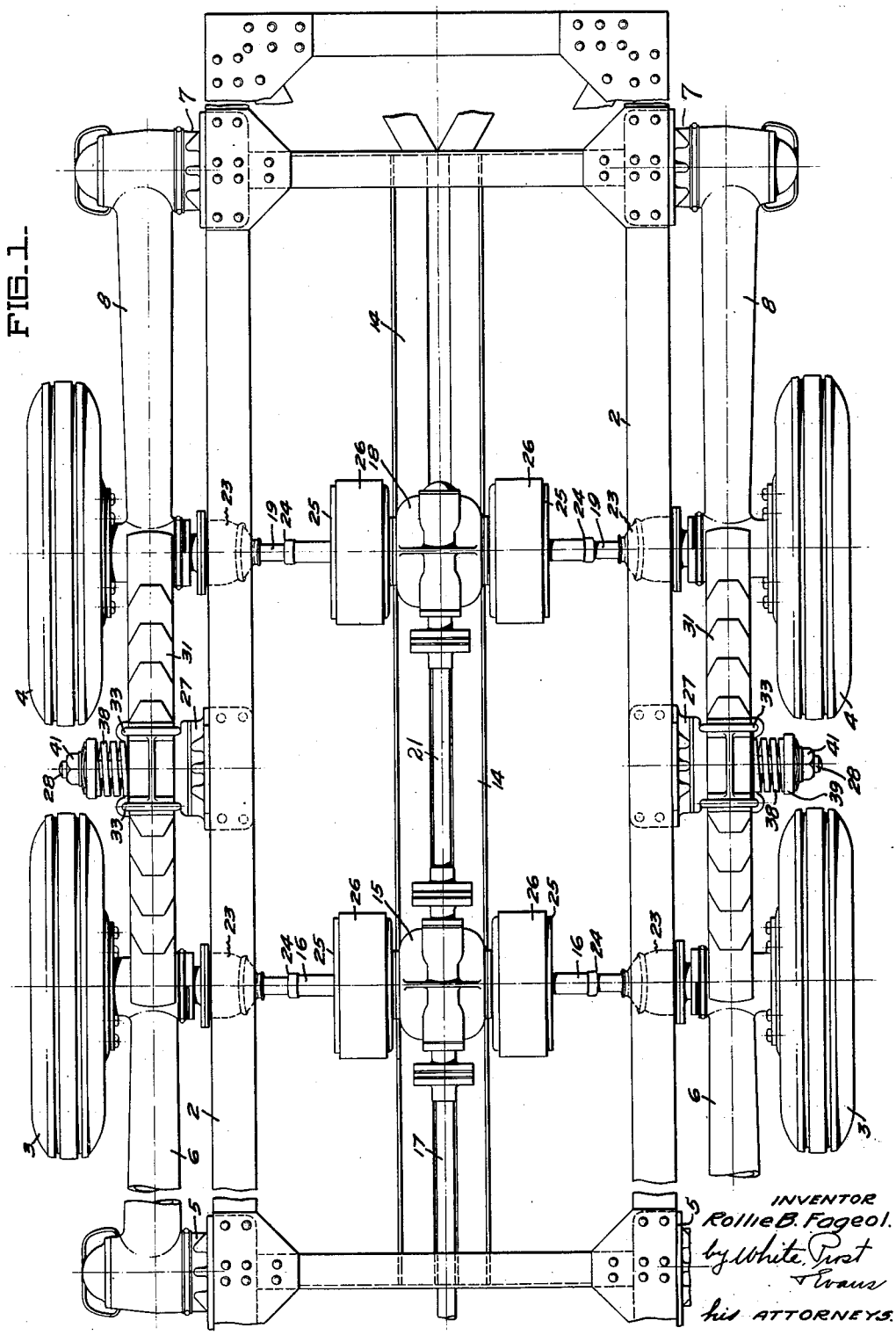

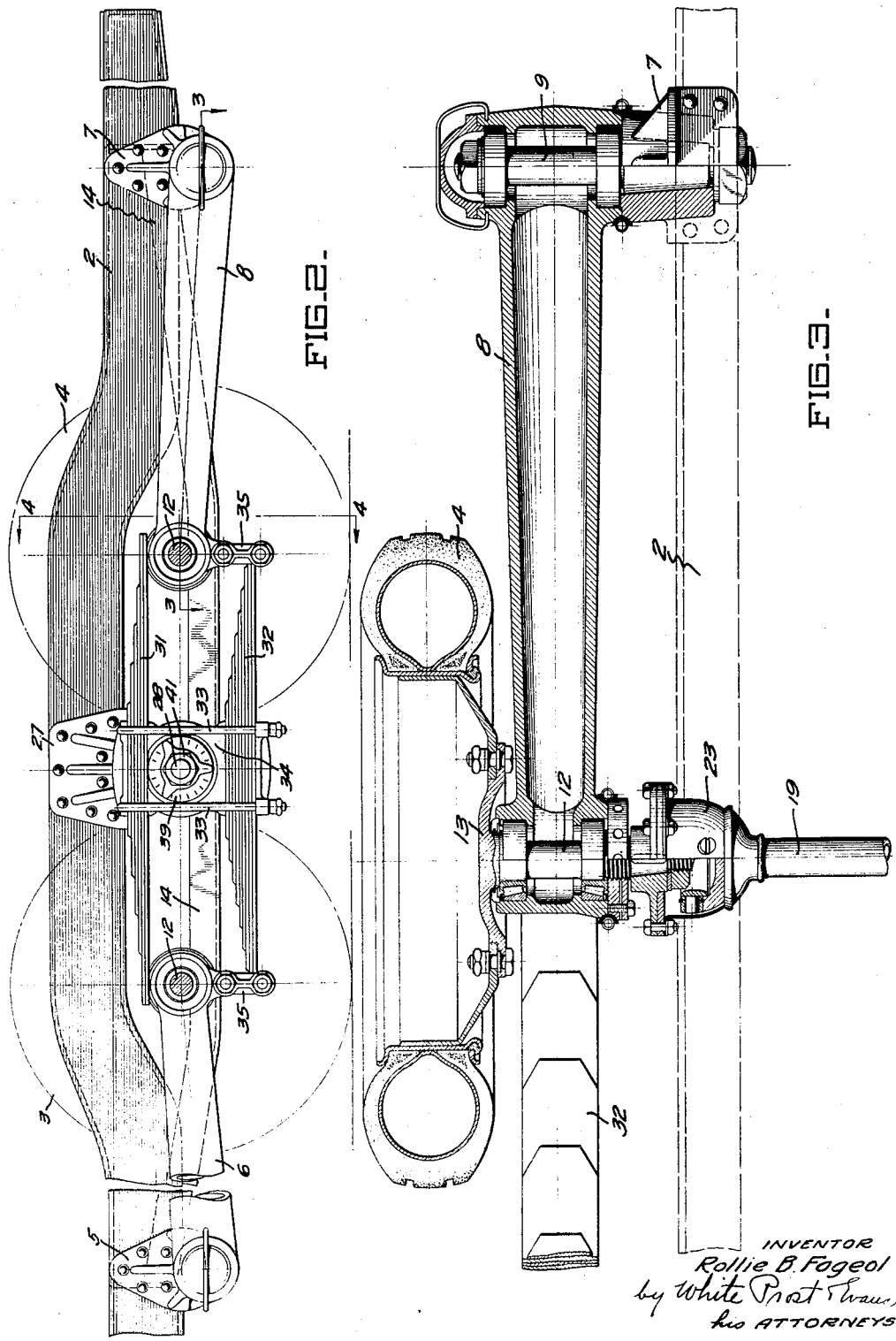

INVENTOR
Rollie B. Fageol
by White Prost & Evans
his ATTORNEYS

Patented Feb. 13, 1934

1,947,337

UNITED STATES PATENT OFFICE 1,947,337

MOTOR VEHICLE

Rollie B. Fageol, Los Angeles, Calif., assignor, by mesne assignments, to Automotive Engineering Corporation, a corporation of Delaware Application February 11, 1925, Serial No. 8,356
Renewed April 12, 1932

18 Claims. (Cl. 180—22)

The invention relates to motor vehicles and particularly to the driving gear of such vehicles embodying four or more driving wheels. An object of the invention is to provide a motor vehicle driving gear having a minimum of unsprung weight.

Another object of the invention is to provide a motor vehicle having four driving wheels arranged adjacent the rear thereof, each wheel being independently movable vertically with respect to the vehicle frame, whereby the riding qualities of the vehicle are improved.

A further object of the invention is to provide a four wheel drive motor vehicle in which each wheel is differentially driven, is separately braked and is independently movable vertically with respect to the vehicle frame.

The invention possesses other advantageous features, some of which, with the foregoing, will be set forth at length in the following description, where I shall outline in full that form of the invention which I have selected for illustration in the drawings accompanying and forming part of the present specification. In said drawings I have shown one form of motor vehicle drive embodying my invention, but it is to be understood that I do not limit myself to such form, since the invention, as set forth in the claims, may be embodied in a plurality of forms.

Referring to said drawings:

Figure 1 is a top or plan view of the rear portion of a motor vehicle provided with the driving and running gear of my invention, a portion thereof being broken away to reduce the size of the figure.

Figure 2 is a side elevation of the portion of the vehicle shown in Figure 1.

Figure 3 is a longitudinal section through one of the wheels and its positioning means, taken on the line 3—3 Figure 2.

Figure 4:
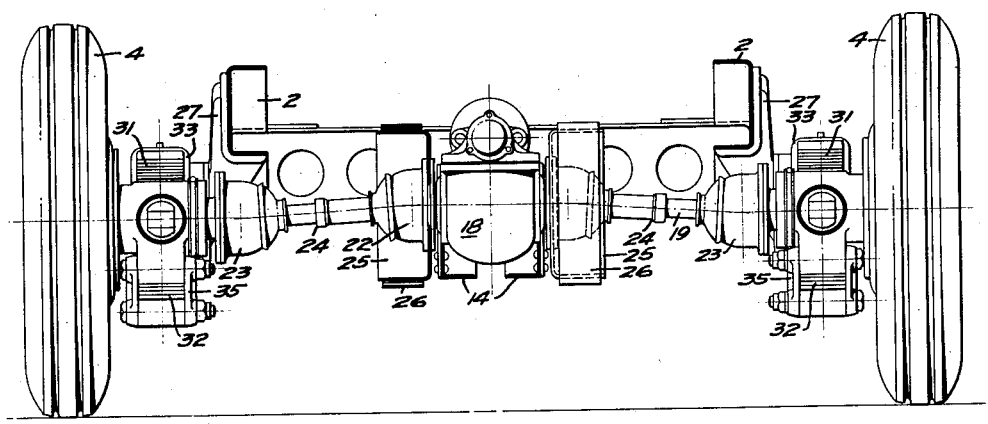
Figure 4 is a vertical section through the vehicle frame taken on the line 4—4 Figure 2.

The vehicle of my invention comprises a frame 2 having two driving wheels 3—4, arranged at each side thereof, the wheels 4 being disposed behind the wheels 3. Each wheel is independently connected to the frame, so that it is capable of independent vertical movement with respect to the frame, thereby improving the riding qualities of the vehicle as it travels over a rough or uneven road. The wheels are held in substantially fixed position longitudinally with respect to the frame, but are free to move vertically. Each wheel is journalled in the free end of a link, which, at its other end, is pivoted to the vehicle frame, the links serving to hold the wheels in proper longitudinally spaced position. Secured to the frame 2 in front of the wheel 3 is a bracket 5 on which a link 6 is pivoted. Secured to the frame 2 behind the wheel 4 is a bracket 7 to which one end of a link 8 is pivoted. The wheels 3 and 4 are disposed between the brackets 5 and 7, so that the link 6 extends backwardly from its pivot and the link 8 extends forwardly from its pivot. The construction of the four links is the same and in Figure 3 I have shown one link 8. The link is pivoted on a pin 9 carried by the bracket 7, so that the link is free to oscillate about the pin. The link is preferably of hollow metallic construction to provide a maximum strength for minimum weight, one of the objects of the invention being to provide a minimum of unsprung weight.

The driving axle 12 of the wheel is journalled in the free end of the link, the driving axle being preferably formed integrally with the hub 13 of the wheel.

In order to reduce the unsprung weight, the transmission housings for the driving shafts for the four wheels, are secured to the vehicle frame, and the driving gears therein are connected to the driving axles of the wheels by flexible shafts, shafts of this nature being required due to the relative movement of the driving axles with respect to the frame. Secured to the main frame 2 of the vehicle, is a sub-frame 14 which is preferably depressed below the main frame and which carries the transmission housing. Secured to the sub-frame 14 in the vertical plane of the axes of the front wheels 3 is a transmission housing 15 from which flexible shafts 16 extend to the two wheels 3. The driving gears within the housing 15, and which include differential gears, are driven by the propeller shaft 17 which is driven by the engine. Due to the inclusion of the differential gears in the transmission housing, the two shafts 16 are differentially driven.

Secured to the sub-frame behind the transmission housing 15 and in the vertical plane of the axes of the wheels 4 is a transmission housing 18, the driving gears of which are connected to the wheels 4 by the flexible shafts 19. The propeller shaft 17 is connected to the transmission gears in the housing 18 by the extension shaft 21 and differential gears are included in the housing 18, so that the shafts 19 are differentially driven. The four wheels 3 and 4 are thus differentially driven and are independently movable vertically with respect to the frame, thereby greatly improving the riding qualities of the vehicle. Each flexible shaft 16 and 19 is provided with two universal joints 22 and 23 and with a slip joint 24, to compensate for varying vertical movement of the wheels with respect to the frame. Secured to each drive shaft adjacent the transmission housing is a brake drum 25, which is engaged by a brake band or brake shoe 26, so that each wheel is provided with braking means. The brakes are disposed adjacent the longitudinal center line of the frame, thereby greatly simplifying the brake apparatus.

Spring means are interposed between the wheels and the frame and, while various forms of spring means may be employed, I prefer to employ the construction shown in Figure 2. Attached to the frame intermediate the two wheels 3 and 4, is a bracket 27 carrying a pin or bolt 28 on which the spring means is fulcrumed. In the present instance this spring means comprises two substantially flat leaf springs 31 and 32, secured together at their centers by bolts 33, which clamp the springs to an interposed block 34, which is journaled on the bolt 28. The spring assembly is thus capable of oscillating about the bolt 28. The ends of the springs 31 are in contact or in approximate contact with the free ends of the links 6 and 8, when the vehicle is lightly loaded. The ends of the springs 32 are connected by means of the shackles 35 with the free ends of the links 6 and 8. I prefer to have the ends of the springs 31 slightly spaced from the upper surfaces of the free ends of the links when the vehicle is lightly loaded, so that these springs will come into effect only when the vehicle is heavily loaded or when a wheel is forced upward by passing over a hump in the road.

Means are provided for damping the oscillation of the spring assembly about the bolt 28, so that the oscillating movement of the spring will not be maintained after the vehicle has passed over the hump. The bracket 27 is provided with a friction face surrounding the bolt 28, which face is engaged by a corresponding face on the block 34. These faces are held in tight contact by a coil spring 38 interposed between the block 34 and the cap 39 surrounding the bolt and held in position by the nut 41.

Figure 5:
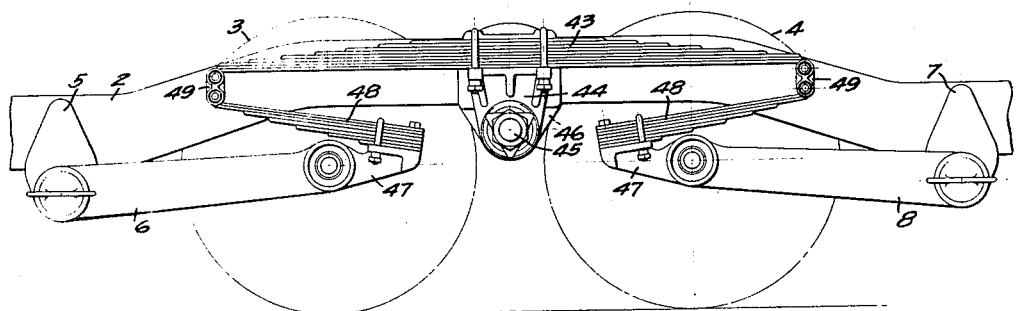
Figure 5 is a side elevation of a modified form of spring suspension interposed between the wheels and the vehicle frame.

In Figure 5 I have shown a modified form of spring suspension which is well adapted for use with the running gear of my invention. In this construction, a flat leaf spring 43 is clamped to a saddle 44 which is journaled on the pin 45, which is carried by the bracket 46 secured to the frame. The pin 45 corresponds to the pin 28 in Figure 2. The wheels 3 and 4 are journalled in the ends of the links 6 and 8, as in the construction shown in Figure 2, and each link is provided with an extension 47, beyond the axle of the wheels, to form a saddle to which the half-springs 48 are secured. The springs 48 are connected at their flexible ends to the flexible ends of the spring 43 by the shackles 49. As in the prior construction, the shock imposed on one axle due to the wheel passing over a hump, is transmitted through the entire spring assembly to the other axle and is substantially absorbed in the entire spring assembly.

I claim:

1. In a motor vehicle, a frame, two differentially driven flexible driving axles disposed one behind the other at the rear end of the frame, springs interposed between the axles and the frame, a link pivoted to the frame at each side thereof, the outer ends of the front drive axle being journalled in the free ends of said links, and an independently mounted second link pivoted to the frame at each side thereof, the outer ends of the rear drive axle being journalled in the free ends of the latter links.

2. In a motor vehicle, a frame, two ground engaging wheels arranged one behind the other at each side of the frame, two links arranged at each side of the frame, each of said links being independently pivoted to the vehicle frame at one end, the wheels being journalled in the other ends of the links, differentially driven flexible drive axles connected to the wheels and springs interposed between the frame and the free ends of the links.

3. In a motor vehicle, a frame, two independently mounted links pivoted to the frame, one behind the other, at each side of the frame, a ground engaging wheel journalled in the free end of each link, springs interposed between the frame and the free ends of the links and a differentially driven flexible axle connected to each wheel.

4. In a motor vehicle, a frame, two relatively movably mounted wheels arranged one behind the other at each side of the frame, springs interposed between the wheels and the frame whereby each wheel is independently movable vertically with respect to the frame and a differentially driven, separate flexible drive shaft associated with each wheel on one side and the corresponding wheel on the other side.

5. In a motor vehicle, a frame, two relatively movably mounted wheels arranged one behind the other at each side of the frame, a link associated with each wheel, each link being pivoted at one end to the frame and having a wheel journalled in its other end, springs interposed between the frame and the free ends of the links, so that each wheel is independently movable vertically with respect to the frame and a differentially driven flexible drive shaft associated with each wheel.

6. In a motor vehicle, a frame, two wheels arranged one behind the other at each side of the frame, springs interposed between the wheels and the frame whereby each wheel is independently movable vertically with respect to the frame and to the other wheels, a transmission housing attached to the frame, flexible drive shafts extending from the housing to the two front wheels, a second transmission housing attached to the frame and flexible drive shafts extending from the second housing to the two rear wheels.

7. In a motor vehicle, a frame, two separate links pivoted to the frame at each side thereof, a wheel journalled in the free end of each link, the two wheels on each side of the frame being arranged one behind the other and being independently movable with respect to every other wheel, springs interposed between the frame and the free ends of the links, a transmission housing secured to the frame, flexible drive shafts extending from the housing to the two front wheels, a second transmission housing secured to the frame and flexible drive shafts extending from the second housing to the two rear wheels.

8. In a motor vehicle, a frame, two separate links pivoted to the frame at each side thereof, a wheel journalled in the free end of each link, the two wheels on each side of the frame being arranged one behind the other, a leaf spring on each side of the frame pivoted intermediate its ends to the frame intermediate the free ends of the links at a point spaced from the pivots of said links, and having its ends in engagement with the free ends of the links, and a drive shaft associated with each wheel.

9. In a motor vehicle, a frame, two wheels arranged one behind the other at each side of the frame, means for holding the two wheels on each side of the frame in proper spaced relation with respect to each other, a leaf spring on each side of the frame pivoted intermediate its ends to the frame and having its ends in operative engagement with the wheels, means for damping the oscillation of the springs about their pivots, a second spring effective when a heavy load is applied to yieldingly resist said load and a drive shaft associated with each wheel.

10. A road vehicle comprising a frame, a pair of axles arranged adjacent one end of said frame, each axle being mounted to swing independently of the other axle with the ends of a pair of arms pivotally connected to said frame at longitudinally spaced points, a bracket secured to said frame between said axles, a spring pivoted to said bracket between its ends and shackled at its ends to said axles.

11. A road vehicle comprising a substantially rigid main frame, a plurality of axles arranged adjacent one end of said main frame, means connecting said axles to said frame to cause them to follow independent predetermined paths, a plurality of springs pivoted to said frame between said axles, said springs being arranged on opposite sides of the axles in position to yieldingly resist the movement of said axles along said paths in both directions.

12. A road vehicle comprising a frame, a pair of wheels arranged in tandem adjacent one end of said frame at each side thereof, an arm for each wheel, each arm being separately pivoted to the frame at one end and supported by a wheel adjacent its other end, whereby each wheel is secured to said frame independently of each of the other wheels and springs arranged between the wheels on both sides of said frame, the spring on each side connected to the wheels on that side being to yieldingly resist the movement of each wheel permitted by the arm that connects it to the frame and additional springs arranged to bear upon said wheels when a heavy load is applied to said vehicle.

13. The combination defined in claim 12 in which each of said springs is pivoted to said frame between its ends.

14. A road vehicle comprising a frame, a pair of axles arranged adjacent one end of said frame, each axle being mounted to swing with the ends of a pair of arms pivotally connected to said frame, a bracket carried by said frame between said axles, a spring pivoted to said bracket between its ends and shackled at its ends to said axles, and a second spring arranged to swing with said first named spring with its ends arranged in proximity to said axles to yieldingly resist the swinging movement thereof.

15. In a multiwheel vehicle construction; a frame; a set of tandem axles disposed at one end of said frame; a suspension at each side of said frame for supporting the latter upon said axles; each suspension comprising a spring pivoted intermediate its ends on a transverse axis and having its ends connected to the axles to support relatively light loads upon the latter, and a second spring connected with the frame intermediate its ends and having its ends arranged substantially over said axles, said second spring being designed to assist the first-named spring in supporting the load during normal operation only when the load has become great enough to cause substantial deflection of said first-named spring.

16. In a multiwheel vehicle, a frame; a set of axles arranged at one end of said frame; a pair of spring assemblies supporting said frame upon said axles; each spring assembly comprising a pair of leaf springs clamped together in superposed relation intermediate their ends to swing as a unit about an axis that is transverse to said frame, the lower spring ends interconnecting the axles to support relatively light loads upon the latter, and the upper spring ends being disposed above the axles and designed to support a portion of the load thereon only upon increase of said load beyond a predetermined value.

17. In a multiwheel vehicle construction, a chassis frame; a set of tandem axles arranged at the rear end of said frame; radius arms connected to the foremost of said axles and extending forwardly for pivotal connection to said frame; means swingingly connecting the rearmost of said axles directly upon a portion of said frame; and a spring suspension system for supporting the load upon said axles; said system comprising springs at the opposite sides of the frame pivoted intermediate their ends on a transverse axis between the front and rear axles, said springs being designed to have their ends free of connections with said axles and to freely support the load upon said front and rear axles.

18. In a vehicle running gear, the combination of a frame, brackets secured on opposed sides of the frame, load supporting means including at least one spring at each side of the frame, means to secure the springs to the brackets, two sets of transversely aligned wheels disposed in tandem adjacent said springs, a pair of inextensible arms pivoted on each side of the frame, means for rotatably mounting the tandem wheels on the free ends of said arms in a manner to permit each arm and its supporting wheel to swing through a predetermined path relative to the frame without undesirable interference from the other arms and their supporting wheels, and the ends of said springs being adapted for sliding engagement with portions of said arms to yieldingly resist upward oscillation of the latter.

ROLLIE B. FAGEOL.